(12) United States Patent
Kil et al.

(10) Patent No.: US 10,408,703 B2
(45) Date of Patent: Sep. 10, 2019

(54) METHOD AND APPARATUS FOR CHECKING SEALING STATE OF HOUSING

(71) Applicant: Samsung Electronics Co., Ltd., Gyeonggi-do (KR)

(72) Inventors: Kwang-Min Kil, Gyeonggi-do (KR); Seong-Joon Kweon, Gyeonggi-do (KR); Kyung-Ho Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1091 days.

(21) Appl. No.: 14/207,348

(22) Filed: Mar. 12, 2014

(65) Prior Publication Data

US 2014/0260550 A1    Sep. 18, 2014

(30) Foreign Application Priority Data

Mar. 12, 2013   (KR) ........................ 10-2013-0026319

(51) Int. Cl.
*G01M 3/32*        (2006.01)
(52) U.S. Cl.
CPC ................................. *G01M 3/3272* (2013.01)
(58) Field of Classification Search
CPC .............................. G01M 3/02; G01M 3/3272
USPC .............. 73/49.3, 49.2, 40–52; 209/522–533
See application file for complete search history.

(56) References Cited

U.S. PATENT DOCUMENTS

| | | | | |
|---|---|---|---|---|
| 3,991,622 A * | 11/1976 | Oowada | ................ | G01M 3/363 73/49.3 |
| 4,771,630 A * | 9/1988 | Croce | ................... | G01M 3/363 73/49.3 |
| 5,767,392 A * | 6/1998 | Belcher | ................... | G01M 3/36 73/41 |
| 6,082,184 A * | 7/2000 | Lehmann | ............ | G01M 3/3281 73/49.3 |
| 6,330,823 B1* | 12/2001 | Raymond | ........... | G01M 3/3218 73/41 |
| 2005/0251541 A1* | 11/2005 | Comper | ............... | F16J 15/3492 708/200 |

(Continued)

FOREIGN PATENT DOCUMENTS

JP       2009121965 A     6/2009

OTHER PUBLICATIONS

Korean Intellectual Property Office, "Notification of the Reasons for Rejection," Application No. KR10-2013-0026319, dated May 21, 2019, 7 pages.

*Primary Examiner* — Marrit Eyassu (57) ABSTRACT

A method of checking a sealing state of a housing includes starting an operation of a pressure sensor configured to measure an internal pressure of the housing. The method includes checking whether or not the housing is pressed. The method further includes checking the sealing state of the housing through checking a measured value of the pressure sensor under a pressure of the housing. An apparatus for checking a sealing state of a housing includes the housing configured to keep an internal space thereof sealed off from an outside, a pressure sensor configured to measure a pressure of the internal space, and an interface unit configured to provide to the pressure sensor a control signal that controls an operation of the pressure sensor, and provide pressure information detected through the pressure sensor.

12 Claims, 7 Drawing Sheets

(56) References Cited

U.S. PATENT DOCUMENTS

| | | | | |
|---|---|---|---|---|
| 2006/0207314 A1* | 9/2006 | Kitazawa | ............ | G01M 3/3236 |
| | | | | 73/49.2 |
| 2007/0000310 A1* | 1/2007 | Yamartino | ............ | G01M 3/205 |
| | | | | 73/40.7 |
| 2011/0007023 A1* | 1/2011 | Abrahamsson | ..... | G02F 1/13338 |
| | | | | 345/174 |
| 2011/0126613 A1* | 6/2011 | Lin | ......................... | G01M 3/10 |
| | | | | 73/40 |
| 2012/0062245 A1* | 3/2012 | Bao | ......................... | H01L 29/84 |
| | | | | 324/661 |
| 2012/0243854 A1* | 9/2012 | Takimoto | ............... | G03B 17/08 |
| | | | | 396/26 |
| 2013/0226475 A1* | 8/2013 | Franklin | ............ | G01M 3/2815 |
| | | | | 702/51 |
| 2013/0257817 A1* | 10/2013 | Yliaho | ................. | G06F 3/0414 |
| | | | | 345/177 |
| 2014/0230526 A1* | 8/2014 | Willemin | ............... | G04D 7/007 |
| | | | | 73/49.3 |
| 2015/0241298 A1* | 8/2015 | Decker | ............... | G01M 3/3218 |
| | | | | 73/40 |
| 2015/0316441 A1* | 11/2015 | Subhash | ............... | G01M 3/147 |
| | | | | 73/49.3 |
| 2015/0362401 A1* | 12/2015 | Hesse | ..................... | G01M 3/36 |
| | | | | 73/49.3 |
| 2015/0371914 A1* | 12/2015 | Ozaki | ............... | H01L 21/67276 |
| | | | | 438/5 |

\* cited by examiner

METHOD AND APPARATUS FOR CHECKING SEALING STATE OF HOUSING

CROSS-REFERENCE TO RELATED APPLICATION(S) AND CLAIM OF PRIORITY

The present application is related to and claims the priority under 35 U.S.C. § 119(a) to Korean Application Serial No. 10-2013-0026319, which was filed in the Korean Intellectual Property Office on Mar. 12, 2013, the entire content of which is hereby incorporated by reference.

TECHNICAL FIELD

The present disclosure relates generally to a portable terminal, and more particularly, to a method and an apparatus for checking a sealing state of a portable terminal case.

BACKGROUND

In recent years, various services and additional functions that a mobile device provides are gradually increasing in use. A variety of applications that can be executed in the mobile device have been developed in order to enhance an effective value of the mobile device and satisfy various desires of users.

Basic applications manufactured by a vendor of a corresponding device to be installed in the corresponding device, and additional applications downloaded from application selling websites through the internet can be stored and executed in the mobile device. The additional applications may be developed by general developers, and may be registered in the application selling websites. Thus, whoever develops applications can freely sell the applications to users of the mobile device through the application selling websites. Accordingly, tens of thousands to hundreds of thousands of applications are currently being provided free of charge or with a fee to the various mobile devices according to the products.

Accordingly, at least tens to hundreds of applications are recently stored in the mobile device such as a smart phone and a tablet PC, and shortcut keys that execute the respective applications are displayed in an icon form on a touch screen of the mobile device. Thus, the users can execute the desired applications in the mobile device by touching any one of the icons displayed on the touch screen.

Meanwhile, some mobile devices provide a waterproof function in order to protect electronic components installed therein from a liquid such as water that damages the electronic components. However, the mobile devices include only a basic protection device that prevents the liquid from flowing into the inside of the mobile devices by simply using a sealing member.

SUMMARY

Although the mobile devices include the sealing member to provide the waterproof function as described above, a check cannot be made as to whether or not the included sealing member completely waterproofs the mobile devices.

To address the above-discussed deficiencies, it is a primary object to provide a method and an apparatus in which a user can check a waterproof state of a mobile device in real time.

In accordance with one aspect of the present disclosure, a method of checking a sealing state of a housing is provided. The method includes starting an operation of a pressure sensor configured to measure an internal pressure of the housing, check whether or not the housing is pressed, and check the sealing state of the housing through checking a measured value of the pressure sensor under a pressure of the housing.

In accordance with another aspect of the present disclosure, an apparatus for checking a sealing state of a housing is provided. The apparatus includes the housing whose internal space thereof keeps sealed off from the outside, a pressure sensor configured to measure a pressure of the internal space; and a controller that controls an operation of the pressure sensor, check the sealing state of the housing by using a variation in the pressure of the internal space according to pressing of a outside wall of the housing, and provide notification of the checked sealing state.

In accordance with another aspect of the present disclosure, an apparatus for checking a sealing state of a housing is provided. The apparatus includes the housing configured to keep the internal space thereof sealed off from the outside, a pressure sensor configured to measure a pressure of the internal space, and an interface unit configured to provide to the pressure sensor a control signal that controls an operation of the pressure sensor, and provide pressure information detected through the pressure sensor, wherein the interface unit is connected to a controller configured to generate the control signal, check the sealing state of the housing by using a variation in the pressure of the internal space according to pressing of an outside wall of the housing, and notifies the checked sealing state.

In accordance with another aspect of the present disclosure, a terminal device is provided. The terminal device includes a housing configured to keep the internal space thereof sealed off from the outside, a pressure sensor configured to measure a pressure of the internal space, at least one controller, and a memory unit configured to store a sealing state checking program, wherein the sealing state checking program is configured to be executed by the controller, and includes a command to control an operation of the pressure sensor, check whether or not the housing is pressed, and check a sealing state of the housing through checking a measured value of the pressure sensor under a pressure of the housing.

In accordance with another aspect of the present disclosure, a computer readable storage medium for storing at least one program is provided. In the computer readable storage medium, the at least one program includes a command to control an operation of a pressure sensor installed in an interior of a housing, check whether or not the housing is pressed, and check a sealing state of the housing through checking a measured value of the pressure sensor under a pressure of the housing.

According to embodiments of the present disclosure, a sealing state of a terminal or a terminal case can be checked in a mobile device.

A user can grasp the sealing state of the terminal or the terminal case before using a waterproof function and can be flexible in responding, by checking the sealing state of the terminal or the terminal case in the mobile device.

The mobile device provides a function of checking the sealing state of the terminal or the terminal case, which allows to prevent a user's mistake.

The sealing state of the terminal or the terminal case is checked in the mobile device without checking the waterproof function through manufacturing equipment of the mobile device so that the manufacturing equipment for the sake of checking the waterproof function is unnecessary, thereby reducing manufacturing costs of the mobile device with the waterproof function.

Before undertaking the DETAILED DESCRIPTION below, it may be advantageous to set forth definitions of certain words and phrases used throughout this patent document: the teens "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic devices. The following description with reference to the accompanying drawings is provided to assist in a comprehensive understanding of exemplary embodiments of the disclosure as defined by the claims and their equivalents. It includes various specific details to assist in that understanding but these are to be regarded as merely exemplary. Accordingly, those of ordinary skilled in the art will recognize that various changes and modifications of the embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of exemplary embodiments of the present disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Figure 1:
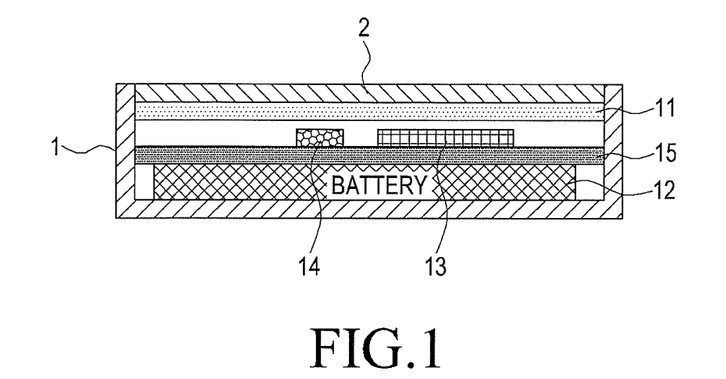
FIG. 1 is a sectional view illustrating a first example of an apparatus to which a method of checking a sealing state of a housing according to an embodiment of the present disclosure is applied.

FIG. 1 is a sectional view illustrating a first example of an apparatus to which a method of checking a sealing state of a housing according to an embodiment of the present disclosure is applied. Referring to FIG. 1, the apparatus to which the method of checking the sealing state of the housing according to the embodiment of the present disclosure is applied may be exemplified as a portable terminal with a waterproof function. The portable terminal can include terminal housings 1 and 2, a touch screen 11, a battery 12 and a pressure sensor 14, which are installed in the terminal housings 1 and 2, and a Printed Circuit Board (PCB) 15 to which various circuit components 13, including a Central Processing Unit (CPU), which are basically installed in the portable terminal are coupled.

In particular, the terminal housings 1 and 2 are configured to form an internal space where the touch screen 11, the battery 12, the circuit components 13, a pressure sensor 14, and the PCB 15 can be installed. The terminal housings 1 and 2 can be configured as a structure in which the internal space is isolated from the outside of the terminal housings so that air or water outside of the terminal housings 1 and 2 should not flow into the internal space.

The pressure sensor 14 can measure a pressure of the internal space. For example, the pressure sensor 14 can start to operate, measure the pressure of the internal space for a predetermined period of time, and provide the measured result to the CPU, when receiving a signal that instructs the pressure sensor 14 to operate from the CPU of the portable terminal.

Figure 2:
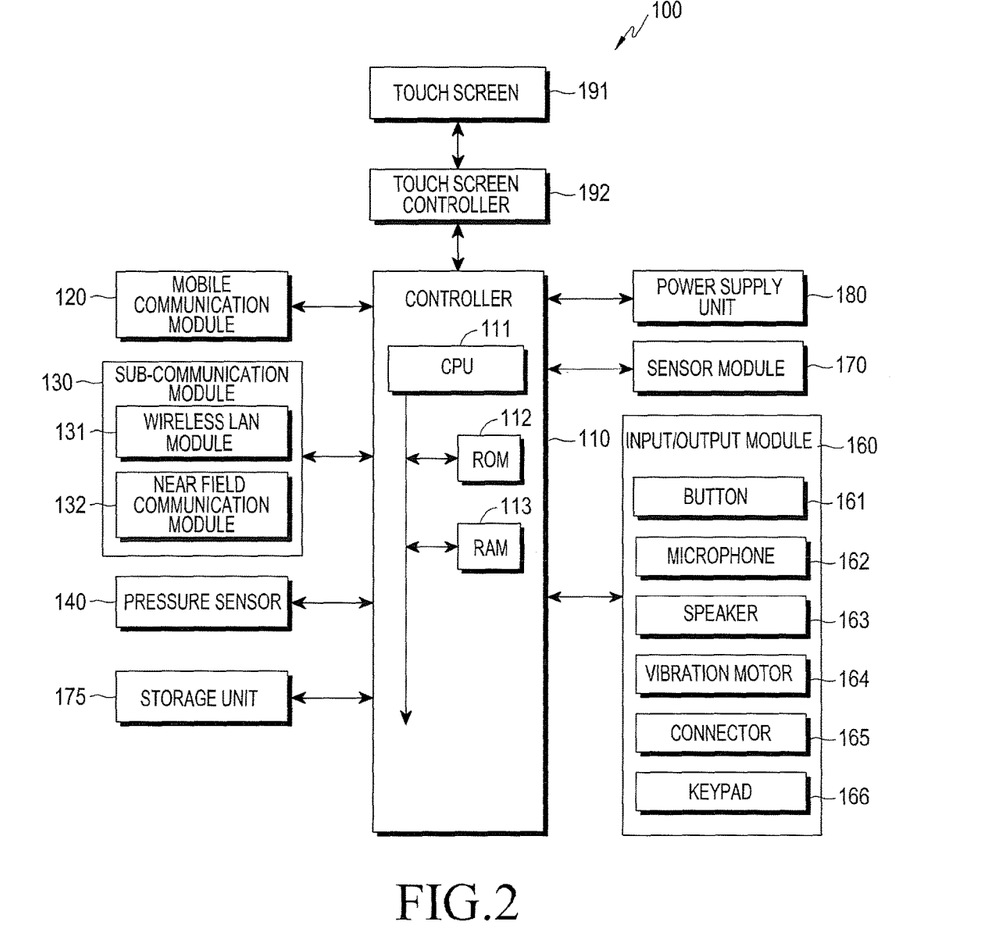
FIG. 2 is a block diagram illustrating an apparatus to which a method of checking a sealing state of a housing according to an embodiment of the present disclosure is applied.

FIG. 2 is a block diagram illustrating an apparatus to which a method of checking a sealing state of a housing according to an embodiment of the present disclosure is applied.

Referring to FIG. 2, an apparatus 100 can be connected with an external device (not illustrated) by using an external device connector such as a sub-communication module 130, a connector 165, or the like. The external device can include various devices, such as earphones, an external speaker, a Universal Serial Bus (USB) memory, a charger, a cradle/dock, a Digital Multimedia Broadcasting (DMB) antenna, a mobile payment related device, a health care device (a blood sugar measuring device), a game machine, and a vehicle navigation device, which can be detachably connected to the apparatus 100 in a wired manner. Further, the external device can include a Bluetooth communication device, a Near Field Communication (NFC) device, a Wi-Fi Direct communication device, and a wireless access point (AP), which can be wirelessly connected to the apparatus 100 through near field communication. Moreover, the external device can include other devices such as a cell phone, a smart phone, a tablet PC, a desktop PC, and a server.

Referring to FIG. 2, the electronic device 100 can include a touch screen 191, a touch screen controller 192. Moreover, the electronic device 100 can include a controller 110, a mobile communication module 120, a sub-communication module 130, a pressure sensor unit 140, a storage unit 175, and a power supply unit 180. The sub-communication module 130 can include at least one of a wireless LAN module 131 and a near field communication module 132.

The controller 110 can control the mobile communication module 120, the sub-communication module 130, the pressure sensor unit 140, the storage unit 175, the power supply unit 180, the touch screen 191, and the touch screen controller 192.

Moreover, the controller 110 can be formed of a single core, a dual core, a triple core, or a quad core.

The mobile communication module 120 allows the electronic device 100 to be connected with the external device through mobile communication by using at least one antenna (not shown) or a plurality of antennas (not shown) under the control of the controller 110. The mobile communication module 120 transmits/receives wireless signals for a voice call, a video call, a short message service (SMS), or a multimedia message service (MMS) to/from a cell phone (not shown), a smart phone (not shown), a tablet PC (not shown), or other devices (not shown), having phone numbers which are input to the electronic device 100.

The sub-communication module 130 can include at least one of the wireless LAN module 131, and the near field communication module 132. For example, the sub-communication module 130 can include only the wireless LAN module 131, only the near field communication module 132, or both the wireless LAN module 131 and the near field communication module 132.

The wireless LAN module 131 can be connected to the interne, at the place where the wireless access point (AP) (not shown) is installed, under the control of the controller 100. The wireless LAN module 131 supports a wireless LAN protocol (WEE802.11x) of the Institute of Electrical and Electronics Engineers (I The wireless LAN module 131 can drive a Wi-Fi positioning system (WPS) for identifying positional information of a terminal including the wireless LAN module 131, by using the positional information which the wireless access point (AP) in wireless connection with the wireless LAN module 131 provides.

The near field communication module 132 can perform near field communication in a wireless manner between the electronic device 100 and an image forming device (not shown) under the control of the controller 110. The near field communication method can include Bluetooth, infrared data association (IrDA), Wi-Fi direct communication, and near field communication (NFC).

The electronic device 100 can include at least one of the mobile communication module 120, the wireless LAN module 131, and the near field communication module 132 according to the performance thereof. For example, the electronic device 100 can include combinations of the mobile communication module 120, the wireless LAN module 131, and the near field communication module 132 according to the performance thereof.

The pressure sensor unit 140 corresponds to a sensor that measures a pressure of the internal space formed by the terminal housings (reference numerals 1 and 2 of FIG. 1) as illustrated in FIG. 1, and can start to operate, measure the pressure of the internal space for a predetermined period of time, and provide the measured result to the controller 110, as receiving an operation instruction signal from a controller 110. Moreover, the pressure sensor unit 140 can be a barometer measuring an atmospheric pressure.

The input/output module 160 can include at least one of a plurality of buttons 161, the microphone 162, the speaker 163, the vibratory motor 164, the connector 165, and the keypad 166.

The buttons 161 can be formed on a front surface, a side surface, or a rear surface of a housing of the electronic device 100, and can include at least one of a power/lock button (not shown), a volume button (not shown), a menu button, a home button, a back button, and a search button 161.

The microphone 162 receives voices or sounds to generate electric signals under the control of the controller 110.

The speaker 163 can output sounds corresponding to various signals (for example, a wireless signal, a broadcasting signal, a digital audio file, a digital video file, or photography) of the mobile communication module 120, the sub-communication module 130, the multimedia module 140, or the camera module 150, to the outside under the control of the controller 110. The speaker 163 can output sounds (for example, a button operation tone corresponding to a telephone call, or a call connection tone) corresponding to functions which the apparatus 100 performs. One or a plurality of speakers 163 can be formed at a proper location or locations of the housing of the apparatus 100.

The vibratory motor 164 can convert an electric signal into a mechanical vibration under the control of the controller 110. For example, when receiving a voice call from another device (not shown), the apparatus 100 in a vibratory mode operates the vibratory motor 164. One or a plurality of vibratory motors 164 can be formed in the housing of the apparatus 100. The vibratory motor 164 can operate in response to a touch of a user on the touch screen 191, and a continuous movement of a touch on the touch screen 191.

The connector 165 can be used as an interface for connecting the electronic device 100 with the external device (not shown) or a power source (not shown). The electronic device 100 can transmit data stored in the storage unit 175 of the electronic device 100 to the external device (not shown), or can receive data from the external device (not shown) through a wired cable connected to the connector 165 under the control of the controller 110. Moreover, the electronic device 100 can receive an electric power from the power source (not shown) through the wired cable connected to the connector 165, or can charge a battery (not shown) by using the power source.

The keypad 166 can receive a key input from the user for the control of the apparatus 100. The keypad 166 includes a physical keypad (not shown) formed in the electronic device 100, or a virtual keypad (not shown) displayed on the touch screen 191.

The physical keypad formed in the electronic device 100 can be excluded according to the performance or the structure of the electronic device 100.

The sensor module 170 includes at least one sensor for detecting the state of the electronic device 100. For example, the sensor module 170 can include a proximity sensor for detecting a user's access to the apparatus 100, an illumination sensor (not shown) for detecting a quantity of light around the electronic device 100, a motion sensor (not shown) for detecting motion (for example, rotation of the electronic device 100, and acceleration or vibration applied to the electronic device 100) of the apparatus 100, a geomagnetic sensor (not shown) for detecting a point of a compass by using earth's magnetic field, a gravity sensor for detecting a direction of gravity, and an altimeter for detecting an altitude by measuring atmospheric pressure. At least one sensor can detect the state, generate a signal corresponding to the detection, and transmit the signal to the controller 110. The sensor of the sensor module 170 can be added or omitted according to the performance of the electronic device 100.

The storage unit 175 can store the signal or the data, which is input and output to correspond to operations of the mobile communication module 120, the sub-communication module 130, the GPS module 155, the input/output module 160, the sensor module 170, and the touch screen 191, under the control of the controller 110. The storage unit 175 can store control programs for the control of the electronic device 100 or the controller 110, or applications.

The term referred to as "storage unit" is used with the meaning including the storage unit 175, the ROM 112 and the RAM 113 in the controller 110, or a memory card (not shown) (for example, an SD card, and a memory stick) which is mounted to the apparatus 100. The storage unit can include a nonvolatile memory, a volatile memory, a hard disk drive (HDD), or a solid state drive (SSD).

The power supply unit 180 can supply an electric power to one or a plurality of batteries (not shown) disposed in the housing of the electronic device 100. The one or the plurality of batteries (not shown) supplies the electric power to the electronic device 100. Moreover, the power supply unit 180 can supply the electric power, which is input from an external power source (not shown) through the wired cable connected with the connector 165, to the electronic device 100. Furthermore, the power supply unit 180 can also supply the electric power, which is input in a wireless manner from the external power source through a wireless charging technology, to the electronic device 100.

The touch screen 191 can provide user interfaces corresponding to various services (for example, telephone calls, data transmission, broadcasting, and photography) to the user. The touch screen 191 can transmit an analog signal, corresponding to at least one touch which is input to the user interface, to the touch screen controller 192. The touch screen 191 can receive the at least one touch through the user's body (for example, fingers including a thumb), or a touchable input means (for example, a stylus pen). Moreover, the touch screen 191 can receive a continuous movement of the at least one touch. The touch screen 191 can transmit an analog signal corresponding to the continuous movement of the input touch to the touch screen controller 192.

For example, the touch screen 191 can be realized in a resistive manner, a capacity manner, an infrared manner, or an acoustic wave manner.

Meanwhile, the touch screen controller 192 converts the analog signal received from the touch screen 191 to a digital signal (for example, X and Y coordinates), and then transmits the digital signal to the controller 110. The controller 110 can control the touch screen 191 by using the digital signal received from the touch screen controller 192. For example, the controller 110 can allow a shortcut icon (not shown), displayed on the touch screen 191 in response to the touch event or the hovering event, to be selected, or can execute the shortcut icon. Moreover, the touch screen controller 192 can also be included in the controller 110.

The methods according to exemplary embodiments of the present disclosure can be implemented in the form of computer-executable program commands and recorded in computer-readable media. The computer-readable media can include program commands, data files, data structures and the like separately or in combination. The program commands recorded in the media can be the program commands which are specially designed and configured for the present disclosure, or can be the program commands which are known to those of ordinary skill in the field of computer software.

The methods according to exemplary embodiments of the present disclosure can be implemented in the form of program commands and stored the storage 150 of the device 100, and the program commands can be temporarily stored in the RAM 113 embedded in the controller 110, for execution of the methods. Accordingly, in response to the program commands implementing the methods, the controller 110 can control the hardware components included in the device 100, temporarily or permanently store in the storage 150 the data generated while executing the methods, and provide UIs needed to execute the methods, to the touch screen controller 172.

Figure 3:
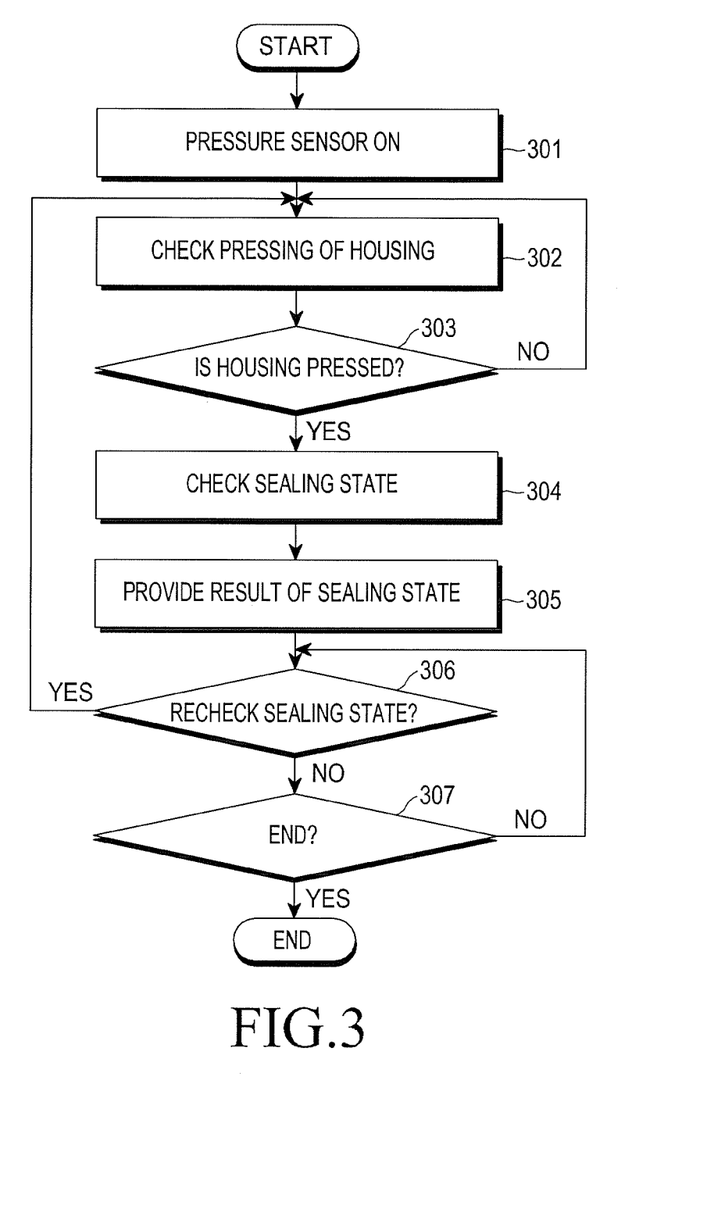
FIG. 3 is a flowchart illustrating an operation procedure of a method of checking a sealing state of a housing according to an embodiment of the present disclosure.

FIG. 3 is a flowchart illustrating an operation procedure of a method of checking a sealing state of a housing according to an embodiment of the present disclosure.

The method of checking the sealing state of the housing according to the embodiment of the present disclosure can be started when a sealing state checking application stored in a storage unit 175 is executed. The sealing state checking application can be actively executed in response to a request for execution of the application through a user's input, or according to satisfaction of a condition having been set in advance in a controller 110.

First, in step 301, the controller 110 provides a signal that instructs a pressure sensor unit 140 to operate to the pressure sensor unit 140 as the sealing state checking application is executed, and the pressure sensor unit 140 operates in response to the signal to measure a pressure.

Figure 4A:
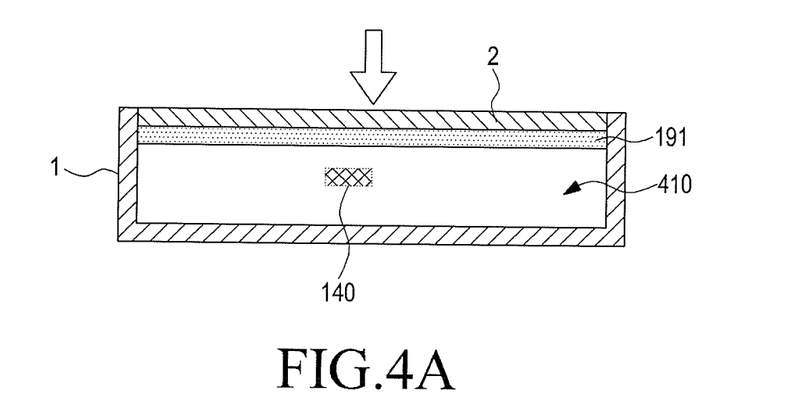
FIGS. 4A and 4B illustrate an example of a pressure variation in an internal space of an apparatus to which a method of checking a sealing state of a housing according to an embodiment of the present disclosure is applied.
Figure 4B:
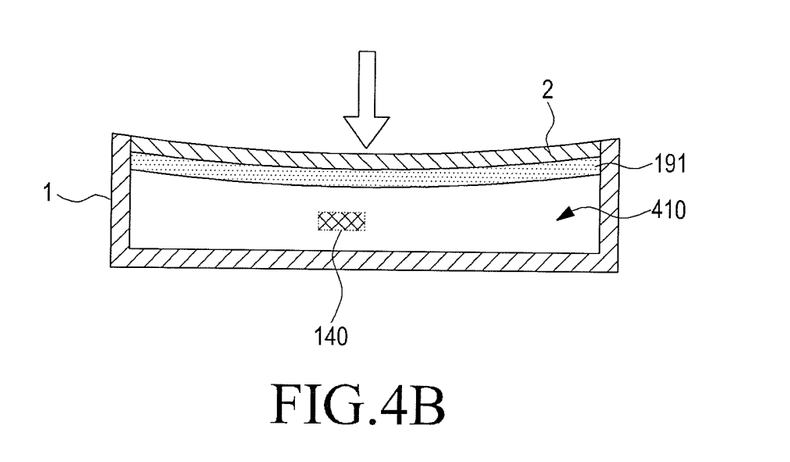

When an external force presses terminal housings 1 and 2 in a state that an internal space 410 is completely sealed off from an external space by the terminal housings 1 and 2 (see FIG. 4A), the pressed area of the terminal housings 1 and 2 is deformed toward the internal space 410 (see FIG. 4B). Accordingly, the pressure of the internal space 410 is increased. However, when an external force presses the terminal housings 1 and 2 in a state that the internal space 410 is not completely sealed off from the external space by the terminal housings 1 and 2, the pressure of the internal space 410 is not varied and is identical with the pressure prior to the pressing.

For example, Table 1 below illustrates measured pressure values of the internal space 410 according to pressing a touch screen, both in the state that the internal space 410 is completely sealed off from the external space by the terminal housings 1 and 2, and in the state that the internal space 410 is not completely sealed off from the external space by the terminal housings 1 and 2.

TABLE 1

|  | Air pressure value before pressing | Air pressure value after pressing (MAX/MIN) |
|---|---|---|
| Sealing state | 950 hPa | 1100 hPa/850 hPa |
| Non-sealing state | 950 hPa | 950 hPa/950 hPa |

Referring to Table 1, in the state that the internal space 410 is completely sealed off from the external space by the terminal housings 1 and 2, a maximum air pressure value is measured when the terminal housings 1 and 2 are maximally pressed, and a minimum air pressure value is measured when the terminal housings 1 and 2 are released. That is, a pressure variation of the internal space 410 is generated. However, in the state that the internal space 410 is not completely sealed off from the external space by the terminal housings 1 and 2, the pressure of the internal space 410 is not varied and is identical with the pressure prior to the pressing, although the terminal housings 1 and 2 are pressed.

Thus, in step 302, a pressed state of the terminal housings 1 and 2 is checked such that the pressure variation of the internal space 410 according to the pressing of the terminal housings 1 and 2 can be checked. For example, the controller 110 can check the pressed state of the terminal housings 1 and 2 by using a touch screen 191 or a keypad 166. More specifically, the controller 110 can determine that the terminal housings 1 and 2 have been pressed, when a touch input occurs on the touch screen 191, or an input occurs through the keypad 166. At this time, the controller 110 can provide a pressing guide user interface (UI) for the sake of checking the pressed state to the touch screen 191, and check the touch input on the touch screen 191 or pressure generation by the keypad 166. The pressing guide UI can include information that requires the touch on the touch screen 191 or pressing of the keypad 166.

Next, when the terminal housings 1 and 2 are pressed (step 303—Yes), the controller 110 proceeds to step 304, and checks a variation in the pressure value measured by the pressure sensor 140. That is, the controller 110 checks a pressure value (hereinafter, referred to as a first pressure value) before the pressing of the terminal housings 1 and 2, and a pressure value (hereinafter, referred to as a second pressure value) after the pressing of the terminal housings 1 and 2. The controller 110 determines that the internal space 410 has not been completely sealed off from the external space by the terminal housings 1 and 2, when the first pressure value is identical with the second pressure value. The controller 110 determines that the internal space 410 has been completely sealed off from the external space by the terminal housings 1 and 2, when the second pressure value is large relative to the first pressure value.

In step 305, the controller 110 displays the result of the sealing state which have been checked in step 304. Moreover, in step 305, the controller 110 can also provide information that guides sealing of the terminal housings 1 and 2, together with the result of the sealing state. For example, the controller 110 can display information that notifies that the sealing has not been stably completed, and can also provide information that notifies that an open state of a portion at which a gap between the terminal housings 1 and 2 can be generated, for example, a connector 165 including an earphone connector, should be checked.

The controller 110 can provide a menu for the sake of rechecking the sealing state of the terminal housings 1 and 2, and can repeatedly perform steps 302 to 305 for the sake of checking the sealing state according to whether or not the menu for the sake of rechecking the sealing state is selected (step 306). The menu can be selected by an input through a predetermined button (for example, a menu button), or by an input through a re-measurement icon included in a user interface (UI) that provides the result of the sealing state of step 305, during the operation of the sealing state checking application.

Moreover, the controller 110 can continuously or repeatedly perform the operations until the sealing state checking application performing the above-described operation is completed.

The completing operation of the sealing state checking application can be performed by a user's end key input, or based on an operating policy of the terminal. For example, the operating policy of the terminal can correspond to a policy by which the sealing state checking application keeps in a standby state or a deactivated state without being displayed, or the sealing state checking application is not continuously displayed for a predetermined period of time to be completed.

Figure 5:
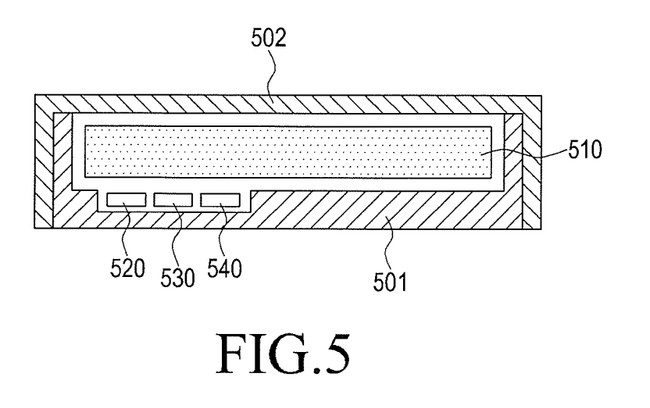
FIG. 5 is a sectional view illustrating a second example of an apparatus to which a method of checking a sealing state of a housing according to an embodiment of the present disclosure is applied.
Figure 6:
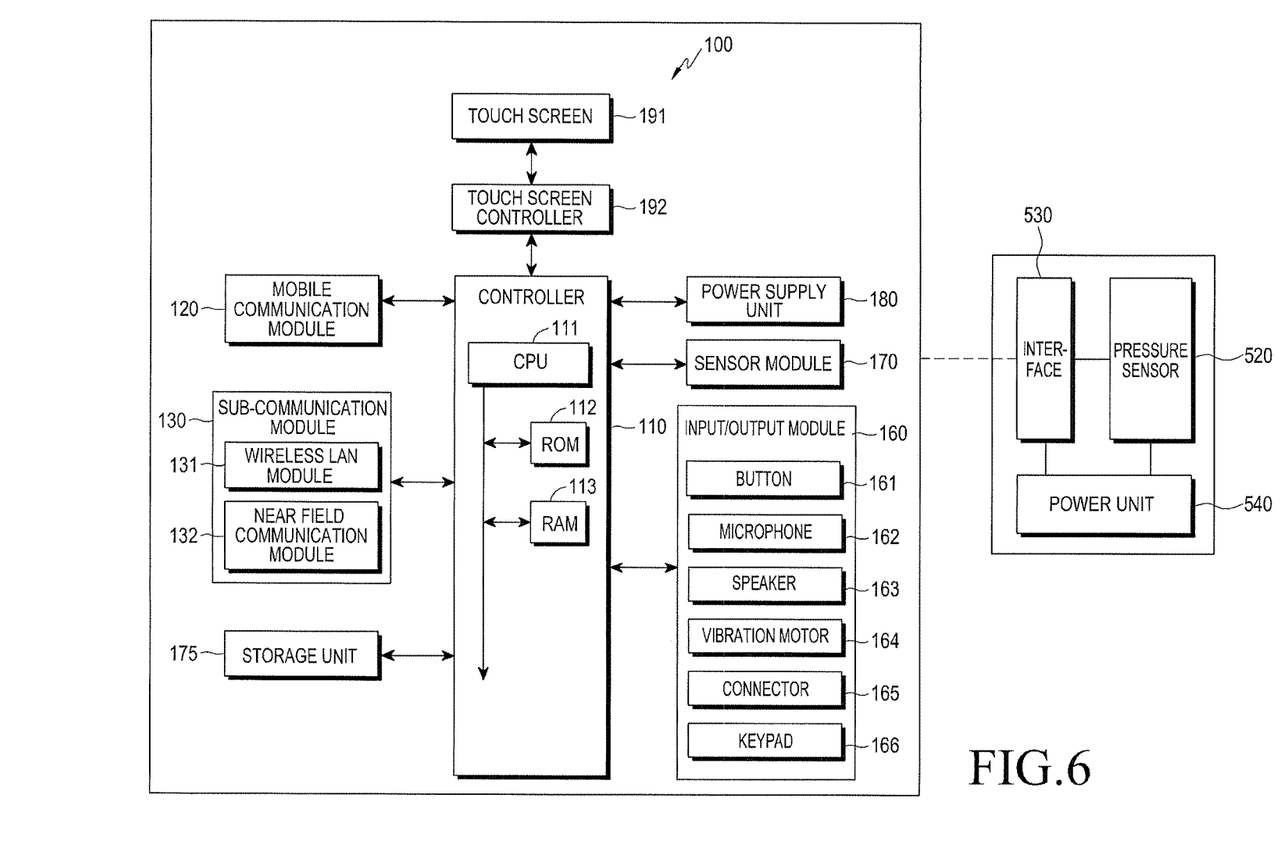
FIG. 6 is a block diagram illustrating a configuration of an apparatus to which a method of checking a sealing state of a housing according to an embodiment of the present disclosure is applied.

FIG. 5 is a sectional view illustrating a second example of an apparatus to which a method of checking a sealing state of a housing according to an embodiment of the present disclosure is applied, and FIG. 6 is a block diagram illustrating a configuration of an apparatus to which a method of checking a sealing state of a housing according to an embodiment of the present disclosure is applied.

Referring to FIGS. 5 and 6, the apparatus to which the method of checking the sealing state of the housing according to the embodiment of the present disclosure is applied can be exemplified as a case apparatus with a waterproof function. The case apparatus can include case housings 501 and 502 configured to form an internal space in which a terminal 510 can be received. The case housings 501 and 502 can be configured as a structure in which the internal space is isolated from the outside of the case housings such that air or water outside of the case housings 501 and 502 should not flow into the internal space.

Here, the terminal 510 is a general mobile communication terminal, and can be configured not to include a pressure sensor but to include the same configuration as that in the first embodiment exemplified with reference to FIG. 2. Instead, a pressure sensor 520 that measures a pressure of the internal space can be installed on one side of the case housings 501 and 502. Moreover, an interface unit 530 that provides a pressure value measured by the pressure sensor 520 to the terminal 510 can be installed on one side of the case housings 501 and 502.

The interface unit 530 can wiredly or wirelessly connect the pressure sensor 520 with the terminal 510, and exchange data or a signal between the pressure sensor 520 and the terminal 510. For example, the interface unit 530 can be configured as an input/output terminal that can be coupled with a connector 165 included in the terminal 510, or a communication module that can wirelessly communicate with a sub-communication module 130 included in the terminal 510.

Moreover, a power unit 540 that supplies power necessary for operating the pressure sensor 520 and the interface unit 530 can be further installed on one side of the case housings 501 and 502. For example, the power unit 540 can be a battery mounted to one side of the case housings 501 and 502, or a connection connector that is wiredly or wirelessly connected with a power supply unit 180 of the terminal 510, and receives an input of power provided from the power supply unit 180 to provide the power to the pressure sensor 520 and the interface 530.

Figure 7:
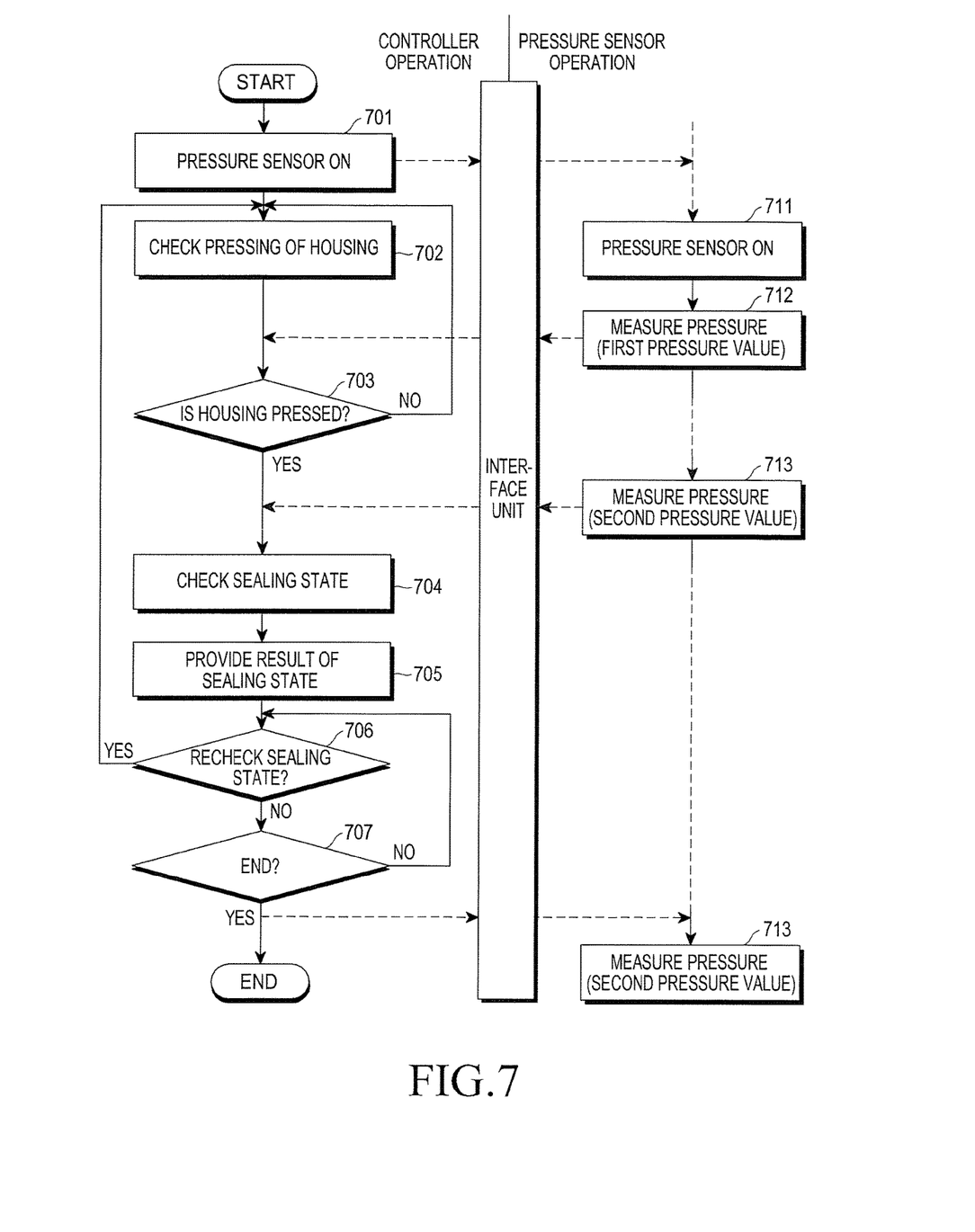
FIG. 7 is a flowchart illustrating an operation procedure of a method of checking a sealing state of a housing according to an embodiment of the present disclosure.

FIG. 7 is a flowchart illustrating an operation procedure of a method of checking a sealing state of a housing according to an embodiment of the present disclosure.

The method of checking the sealing state of the housing according to the embodiment of the present disclosure can be started as a sealing state checking application stored in a storage unit 175 is executed. The sealing state checking application can be actively executed in response to a request for execution of the application through a user's input, or according to satisfaction of a condition having been set in advance in a controller 110.

First, in step 701, the controller 110 provides a signal that instructs a pressure sensor unit 140 to begin operation, to the pressure sensor unit 140 through an interface unit 530 as the sealing state checking application is executed.

The pressure sensor unit 140 starts an operation in response to the signal (step 711), and measures a pressure of the internal space (step 712). The pressure of the internal space can be periodically measured per predetermined unit of time from start to finish of the operation.

Meanwhile, when an external force presses case housings 501 and 502 in a state that an internal space is completely sealed off from an external space by the case housings 501 and 502, the pressed area of the case housings 501 and 502 is deformed toward the internal space. Accordingly, the pressure of the internal space is increased. However, when an external force presses the case housings 501 and 502 in a state that the internal space is not completely sealed off from the external space by case housings 501 and 502, the pressure of the internal space is not varied and is identical with the pressure prior to the pressing.

Thus, in step 702, a pressed state of the case housings 501 and 502 is checked such that the pressure variation of the internal space according to the pressing of the case housings 501 and 502 can be checked. For example, since the case housings 501 and 502 and a terminal 100 are kept attached to each other, the controller 110 included in the terminal 100 can check the pressed state of the case housings 501 and 502 by using a touch screen 191 or a keypad 166. More specifically, the controller 110 can determine that the case housings 501 and 502 have been pressed, when a touch input occurs on the touch screen 191, or an input occurs through the keypad 166. At this time, the controller 110 can provide a pressing guide user interface (UI) for the sake of checking the pressed state to the touch screen 191, and check the touch input on the touch screen 191 or pressure generation by the keypad 166. The pressing guide UI can include information that requires the touch on the touch screen 191 or pressing of the keypad 166.

Next, when the case housings 501 and 502 are pressed (step 703—Yes), the controller 110 proceeds to step 704, and checks a variation in the pressure value measured by a pressure sensor 520. That is, the controller 110 checks a pressure value (hereinafter, referred to as a first pressure value) before the pressing of the case housings 501 and 502, and a pressure value (hereinafter, referred to as a second pressure value) after the pressing of case housings 501 and 502. The controller 110 determines that the internal space has not been completely sealed off from the external space by the case housings 501 and 502, when the first pressure value is identical with the second pressure value. The controller 110 determines that the internal space has been completely sealed off from the external space by case housings 501 and 502, when the second pressure value is large relative to the first pressure value.

Although the pressure sensor 520 which periodically measures and provides the pressure of the internal space per predetermined unit of time is exemplified in the embodiment of the present disclosure, the present disclosure is not limited thereto. For example, as an alternative to the above-described method, the pressure sensor 520 can be configured to measure the pressure only at a time point when pressure measurement for the internal space is requested by the controller 110. The controller 110 can issue a signal that requests the pressure measurement only after issuing a signal that instructs the pressure sensor 520 to operate, and can issue anew the signal which requests the pressure measurement only after the case housings are checked to be pressed (namely, after step 702). Accordingly, the pressure sensor 520 can also be configured to perform the pressure measurement for the internal space, and provide the measured pressure value to the controller 110, at a time point when the pressure sensor 520 receives the signal which requests the pressure measurement.

In step 705, the controller 110 displays the result of the sealing state which have been checked in step 704. Moreover, in step 705, the controller 110 can also provide information that guides sealing of case housings 501 and 502, together with the result of the sealing state. For example, the controller 110 can display information that notifies that the sealing has not been stably completed, and can also provide information that notifies that an open state of a portion at which a gap between the case housings 501 and 502 can be generated, for example, the open state of a connector 165 including an earphone connector should be checked.

The controller 110 can provide a menu for the sake of rechecking the sealing state of the case housings 1 and 2, and can repeatedly perform steps 702, 703, 704, 705, 712, and 713 for the sake of checking the sealing state according to whether or not the menu for the sake of rechecking the sealing state is selected (step 706). The menu can be selected by an input through a predetermined button (for example, a menu button), or by an input through a re-measurement icon included in a user interface (UI) that provides the result of the sealing state of step 705, during the operation of the sealing state checking application.

Moreover, the controller 110 can continuously or repeatedly perform the operations until the sealing state checking application performing the above-described operation is completed.

The completion operation of the sealing state checking application can be performed by a user's end key input, or based on an operating policy of the terminal. For example, the operating policy of the terminal can correspond to a policy by which the sealing state checking application keeps in a standby state or a deactivated state without being displayed, or the sealing state checking application is not continuously displayed for a predetermined period of time to be completed.

Meanwhile, the controller 110 can provide a command that completes the operation of the pressure sensor 520 so that the pressure sensor 520 should not be unnecessarily kept in an ON state, when the sealing state checking application is finished.

It will be appreciated that the exemplary embodiments of the present disclosure cancan be implemented in a form of hardware, software, or a combination of hardware and software. Any such software can be stored, for example, in a volatile or non-volatile storage device such as a ROM, a memory such as a RAM, a memory chip, a memory device, or a memory IC, or a recordable optical or magnetic medium such as a CD, a DVD, a magnetic disk, or a magnetic tape, regardless of its ability to be erased or its ability to be re-recorded. It can be also appreciated that the memory included in the mobile terminal is one example of machine-readable devices suitable for storing a program including instructions that are executed by a processor device to thereby implement embodiments of the present disclosure.

Accordingly, the present disclosure includes a program for a code implementing the apparatus and method described in the appended claims of the specification and a machine (a computer or the like)-readable storage medium for storing the program. Moreover, such a program as described above can be electronically transferred through an arbitrary medium such as a communication signal transferred through cable or wireless connection, and the present disclosure properly includes the things equivalent to that. Moreover, the above-described mobile terminal can receive the program from a program provision device which is connected thereto in a wired or wireless manner, and store the program.

The program providing device may include a program including instructions that allow a predetermined content protection method to be performed, a memory that stores information necessary for the content protection method, a communication unit that performs wired or wireless communication, and a controller that controls transferring of the program. The program providing device may provide the program to the portable terminal in a wired or wireless method, when receiving a request for provision of the program from the portable terminal. Moreover, the program providing device may also be formed to provide the program to the portable terminal in the wired or wireless method, even when not receiving the request for the provision of the program from the portable terminal, for example, when the portable terminal is situated within a specific location.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An operation method of a terminal, the method comprising:
    in response to initiating an application for checking a sealing state of the terminal, displaying a notification requiring a touch input on a touch screen of the terminal;
    activating a pressure sensor for measuring an internal pressure of a housing of the terminal, while displaying the notification;
    detecting a variation of the internal pressure of the housing while the touch input is applied on the touch screen;
    identifying that the housing is kept sealed based on an increase in the internal pressure of the housing;
    identifying that the housing is not sealed based on an invariance in the internal pressure of the housing; and
    displaying information indicating whether the terminal is kept sealed or is not sealed.

2. The operation method of claim 1, wherein detecting the variation of the internal pressure of the housing comprises:
    comparing a first value of the internal pressure measured before the touch input is inputted with a second value of the internal pressure measured after the touch input is inputted.

3. The operation method of claim 2, wherein detecting the variation of the internal pressure of the housing comprises:
    activating the touch screen;
    detecting the touch input on the touch screen; and
    identifying whether the terminal containing the touch screen is pressed, in response to the touch input occurring on the touch screen.

4. The operation method of claim 1, wherein detecting the variation of the internal pressure of the housing comprises:
    checking whether or not an input is entered through at least one keypad installed on the terminal.

5. The operation method of claim 4, wherein detecting the variation of the internal pressure of the housing comprises:
    detecting the input through the at least one keypad installed on the terminal; and
    checking that the terminal is pressed, based on the input through the keypad.

6. The operation method of claim 1, further comprising:
    based on the housing being identified as to be sealed, displaying information notifying that the housing remains to be sealed.

7. The operation method of claim 1, further comprising:
    based on the housing being identified as not to be sealed, displaying information notifying that the terminal is not sealed.

8. The operation method of claim 7, further comprising:
    displaying information that guides sealing of the housing of the terminal.

9. A terminal device comprising:
    a housing configured to keep an internal space thereof sealed off from an outside;
    a pressure sensor configured to measure a pressure of the internal space;
    at least one controller; and
    a memory unit configured to store a program for checking a sealing state of the terminal device,
    wherein the program is configured to be executed by the at least one controller, and comprises a command to:
        in response to initiating the program, display a notification requiring a touch input on a touch screen of the terminal device,
        activate the pressure sensor for measuring the pressure of the internal space, while displaying the notification,
        detect a variation of the pressure of the internal space while the touch input is applied on the touch screen,
        identify that the housing is kept sealed, based on an increase in the pressure of the internal space,
        identify that the housing is not sealed, based on an invariance in the pressure of the internal space; and
        display information indicating whether the terminal device is kept sealed or is not sealed.

10. The terminal device of claim 9, wherein the at least one controller is configured to compare a first value of the pressure measured before the touch input is inputted with a second value of the pressure measured after the touch input is inputted.

11. The terminal device of claim 9, wherein the at least one controller is configured to display information advising to keep the housing of the terminal device sealed on the touch screen, if the housing is identified as to be sealed.

12. A non-transitory computer readable storage medium for storing at least one program, wherein the at least one program comprises a command to:

in response to initiating a program for checking a sealing state of a terminal, display a notification requiring a touch input on a touch screen of the terminal;

activate a pressure sensor for measuring pressure of an internal space, while displaying the notification;

detect a variation of the pressure of the internal space while the touch input is applied on the touch screen;

identify that a housing of the terminal is kept sealed, based on an increase in the pressure of the internal space;

identify that the housing of the terminal is not sealed, based on an invariance in the pressure of the internal space; and display information indicating whether the terminal is kept sealed or is not sealed.

\* \* \* \* \*